United States Patent [19]

Iwata

[11] Patent Number: 4,584,248

[45] Date of Patent: Apr. 22, 1986

[54] SEALED LEAD-ACID SECONDARY CELL

[75] Inventor: Masashi Iwata, Kyoto, Japan

[73] Assignee: Japan Storage Battery Company Limited, Kyoto, Japan

[21] Appl. No.: 657,439

[22] Filed: Oct. 3, 1984

[51] Int. Cl.$^4$ ............................................. H01M 2/12
[52] U.S. Cl. ...................................... 429/54; 429/78; 429/86; 429/89; 429/225
[58] Field of Search .................................. 429/53–55, 429/59, 72, 82, 86, 89, 225

[56] References Cited

U.S. PATENT DOCUMENTS

| | | | |
|---|---|---|---|
| 3,398,026 | 8/1968 | Andre | 429/54 |
| 3,537,902 | 11/1970 | Murata | 429/55 X |
| 3,798,073 | 3/1974 | Karpal | 429/54 |
| 3,915,752 | 10/1975 | Gross | 429/86 |

FOREIGN PATENT DOCUMENTS 648524  1/1951  United Kingdom ................. 429/55

Primary Examiner—Anthony Skapars
Attorney, Agent, or Firm—Sughrue, Mion, Zinn, MacPeak and Seas

[57] ABSTRACT

A sealed lead-acid secondary cell of the type that absorbs oxygen by the negative electrode, is characterized in that a porous member impregnated with a liquid substance is disposed within or outside of a safety valve, or in contact with the bottom of said safety valve.

5 Claims, 8 Drawing Figures

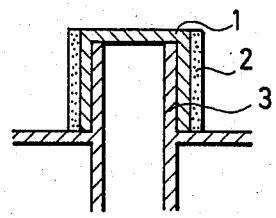
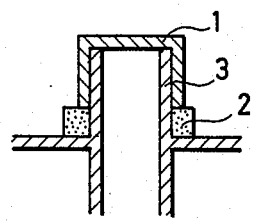
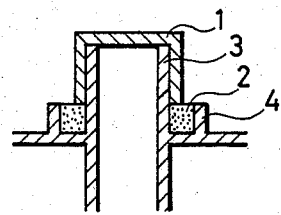
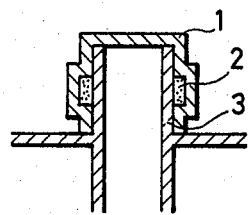
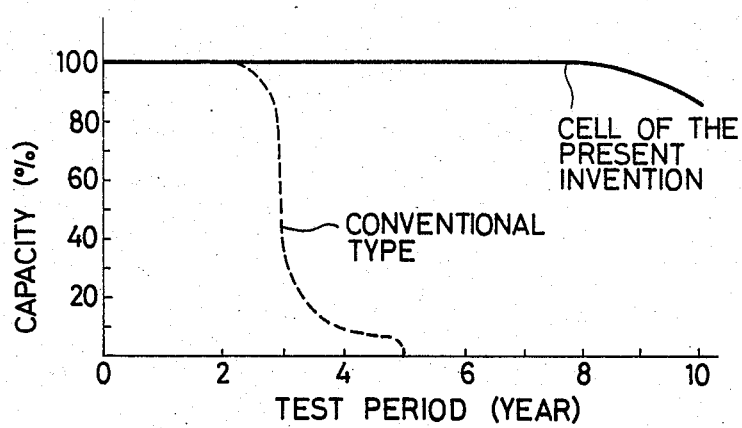

SEALED LEAD-ACID SECONDARY CELL

BACKGROUND OF THE INVENTION

The present invention relates to a safety valve for use in a sealed lead-acid secondary cell, and more particularly, to a safety valve with a prolonged life and improved explosion protection.

Two types of sealed lead-acid secondary cells are known; one uses a catalyst plug, and the other uses the negative electrode to absorb oxygen that has been evolved in the charging cycle. The present invention concerns the second type of sealed lead-acid cell.

The second type of sealed lead-acid secondary cells have many advantages: no water need be added during the life of the cell, no electrolyte will leak, the cell can be used in any position (independent of attitude), and there is no need for occasional equalizing discharge. Because of this maintenance-free feature, sealed lead-acid secondary cells of the type that absorb oxygen by the negative plate are making inroads into various fields such as portable VTRs, portable TV sets, emergency power sources and portable power sources.

The lead-acid secondary cell of the type contemplated by the present invention ensures electrolyte sealing by using the negative electrode to absorb oxygen that has evolved during the charging cycle. Therefore, the pressure in the cell is lower than atmospheric pressure by the difference corresponding to the partial oxygen pressure. This type of cell is equipped with a safety valve that prevents atmospheric oxygen from entering the cell and relieves an abnormal increase in the cell pressure. The safety valve used with this type of cell is typically made of rubber. The proper operation of the cell requires that the safety valve made of rubber (hereunder referred to as a rubber valve) opens and closes at predetermined pressures. In other words, a deteriorated rubber valve will cause serious damage to the cell performance. For example, if the rubber valve sticks to its valve seat, the valve opening pressure increases to cause bulging of the cell. If the valve closing pressure drops, atmospheric oxygen will enter the cell to decrease its capacity.

Therefore, one object of the present invention is to provide a sealed lead-acid secondary cell equipped with a safety rubber valve whose opening and closing pressures are maintained constant throughout the cell service.

This object can be achieved by maintaining a supply of an oil to a rubber valve from a porous member that is impregnated with the oil and which is disposed around or below the valve. Alternatively, the rubber valve may be submerged in a liquid substance so as to prevent oxidative deterioration of the rubber. In a third embodiment, two or more rubber valves may be connected in series in such a manner that the valve positioned closer to the cell element opens at a higher pressure whereas the valve positioned farther away from the element opens at a lower pressure. The rubber valve farther away from the element has a relatively small tensile stress and undergoes only a small amount of plastic deformation. Furthermore, the life of that rubber valve is extended since it has a reduced chance of direct contact with sulfuric acid mist.

These are current trends for sealed lead-acid secondary cells to be incorporated in sophisticated electronic equipment and for larger-size cells to be employed. This requires utmost care in protecting the cells from explosion, but none of the commercially available sealed lead-acid cells feature complete protection against explosion. If the constant-voltage charging of the cell is normal, the predominant gas evolving in the cell is hydrogen and the presence of oxygen that might cause an explosion is negligible. However, if the cell is overcharged at a rate exceeding the ability of the negative electrode to absorb evolving oxygen, or if the battery charger fails and the cell is kept charged with excessively large currents, a high volume of oxygen is evolved to cause a pressure buildup in the cell. The safety valve opens and the volumetric ratio of hydrogen to oxygen in the cell becomes 2:1. If there occurs a spark or other sources of ignition in the neighborhood of the cell, it blows.

It is therefore very important to provide an explosion protection around the safety valve from which oxygen escapes. However, rubber of which the safety valve is made unavoidably deteriorates with time. Another cause of rubber deterioration is an electrolyte splash. If the rubber becomes deteriorated, the safety valve does not close sufficiently to prevent the formation of lead sulfate at the negative electrode. If this occurs, the cell discharges by itself and its capacity drops. The life of the cell using a deteriorated rubber valve can be extended by replacing it with a new valve.

Therefore, another object of the present invention is to provide a sealed lead-acid secondary cell which is explosion-proof and has a prolonged life. This object can be achieved by equipping the gas vent with a detachable explosion-preventing filter which covers the rubber valve. The filter renders the cell explosion-proof and extends its life by permitting easy valve replacement.

BRIEF DESCRIPTION OF THE DRAWINGS

FIG. 1 shows various valve layouts wherein a porous member impregnated with a liquid substance such as oil is disposed around the rubber valve;

FIG. 2 is a graph showing the time-dependent change of the capacity of a sealed lead-acid secondary cell incorporating the concept of the present invention;

PREFERRED EMBODIMENTS OF THE INVENTION

According to the present invention, a porous member impregnated with oil is disposed around or below the rubber valve. Various layouts for the installation of the porous member are illustrated in FIG. 1. In FIG. 1(A), the rubber valve indicated at 1 is surrounded by the oil-impregnated porous member indicated at 2; in FIG. 1(B), the porous member 2 is positioned below the rubber valve 1; in FIG. 1(C), the porous member 2 is positioned below the rubber valve and is provided with a barrier 4 that prevents oil leakage; in FIG. 1(D), the porous member 2 is entirely covered by the rubber valve 1 and valve seat 3 in order to prevent the evaporation of the oil.

The porous member 2 to be impregnated with oil may be made of any material that has open cells. Illustrative materials include a polyethylene foam, polypropylene foam, polyurethane foam, as well as sintered alumina and sintered copper.

Two sealed lead-acid secondary cells with a capacity of 40 A.h.×12 V were fabricated; one sample used an oil-impregnated porous member that was completely covered with the rubber valve as shown in FIG. 1(D) according to the present invention, and the other was of the conventional type using no oil-impregnated porous member. The two cells were subjected to an accelerated life test under floating at 2.25 volts/cell. The time-dependent change of the cell capacity is depicted in FIG. 2 as the percentage of the initial capacity. The capacity of the cell according to the present invention started to drop when eight years had passed. This was simply because the lead alloy grid as the positive plate was badly corroded to the point where the structure started breaking down and was no longer usable as the electrode plate. Surprisingly enough, the rubber valve was still operating at the predetermined closing and opening pressures. The deterioration of rubber could be prevented for two probable reasons: the oil pregnated in the porous member gradually entered micro pores in the rubber and protected it from deterioration by atmospheric oxygen; and a thin oil film forming on the rubber surface provided a barrier against the attack of sulfuric acid mist evolving in the charging cycle. In contrast with the cell of the present invention, the conventional cell experienced a significant drop in capacity between the second and fourth years. This was because rubber was deteriorated to make the proper closing of the valve impossible and as a consequence, atmospheric oxygen entered the cell and caused the negative electrode to turn into lead sulfate, which eventually lead to a capacity drop.

Figure 3:
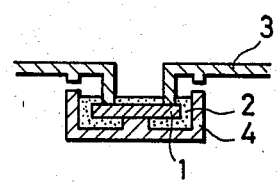
FIG. 3 shows a valve layout wherein the rubber valve is submerged completely in a liquid substance such as oil.

From the experimental data shown above, it will be understood that the deterioration of the rubber valve can also be prevented by submerging it within oil. As shown in FIG. 3, the rubber valve 1 may be completely submerged within oil 2 and isolated from the atmosphere. In the illustrated embodiment, the oil is accommodated within a valve seat 4 forming part of a cover 3.

Figure 4:
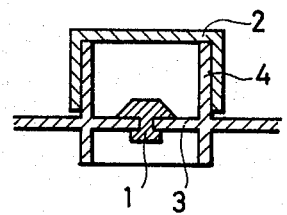
FIG. 4 shows a valve layout wherein two rubber valves are connected in series.

According to another embodiment of the present invention, two or more rubber valves are arranged in series connection. In FIG. 4, two rubber valves 1 and 2 are connected in series; rubber valve 1 is positioned closer to the element and fitted into a valve seat 3, whereas valve 2 is farther away from the element and is fitted over a valve seat 4. The two valves are designed to open at, for example, 0.3 kg/cm² and 0.1 kg/cm², respectively.

A sealed lead-acid secondary cell (capacity: 40 A.h.×12 V) was fabricated according to this embodiment of the present invention and subjected to an accelerated life test under floating at 2.25 volts/cell. The time-dependent change in the valve opening pressure for each rubber valve was checked and shown in the following Table 1.

TABLE 1

| Years passed | Value opening pressure (kg/cm²) | |
|---|---|---|
| | Valve 1 | Valve 2 |
| 1 | 0.3 | 0.1 |
| 2 | 0.2 | 0.1 |
| 3 | 0 | 0.1 |
| 5 | 0 | 0.1 |
| 7 | 0 | 0.1 |

TABLE 1-continued

| Years passed | Value opening pressure (kg/cm²) | |
|---|---|---|
| | Valve 1 | Valve 2 |
| 10 | 0 | 0 |

The opening pressure of valve 1 which was positioned closer to the element than valve 2 dropped to zero in about three years, and the primary reasons were an extensive deposit of sulfuric acid mist and a great tensile stress on the valve. On the other hand, rubber valve 2 withstood about ten years of use.

Another advantage with the valve arrangement shown in FIG. 4 is that it permits easy replacement of rubber valve 2 since no air will enter the cell as soon as said valve is removed. In other words, the layout of FIG. 4 is effective in prolonging the life of the valve system, and hence the cell proper.

Figure 5:
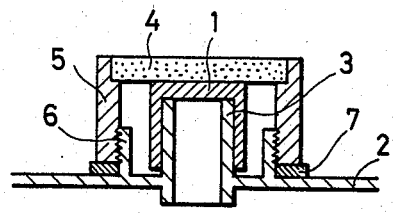
FIG. 5 shows a layout using the rubber valve in combination with an explosion-preventing filter.

Still another embodiment of the present invention is characterized by using a rubber valve in combination with an explosion-preventing filter. As shown in FIG. 5, a cap-shaped rubber valve 1 is slipped over a tubular valve 3 erected on a cover 2. Above the rubber valve 1 is positioned an explosion-preventing filter 4 which is fixed air-tightly to a tubular filter holder 5 by an adhesive agent. The filter 4 is disposed in such a manner that it closes the opening in the top of the filter holder 5 which is large enough to encompass the valve 1 and valve seat 3. The cover 2 is provided with a projecting wall 6 to fix said filter holder 5. The wall 6 is provided with a male thread that engages a female thread cut in the filter holder 5 to render the filter 4 easily attachable to or detachable from the cell element. A packing 7 is inserted between the filter holder 5 and cover 2 so as to ensure the air-tightness of the space defined by the filter 4 and the filter holder 5. In the embodiment shown, when the filter holder 5 is fixed to the wall 6, the rubber valve 1 comes to be positioned below the filter 4 which presses down the top of the valve 1 so that it will not separate from the valve seat 3.

According to the embodiment shown in FIG. 5, when the pressure in the cell increases as a result of charging, the gas evolved causes the rubber valve 1 to spread out and is discharged through the filter 4. This provides a complete protection against explosion which may occur at the gas vent. A deteriorated rubber valve 1 can be readily replaced by detaching the filter holder 4 from the wall 6, and this will lead to the extension of the cell life.

As shown in the foregoing, the present invention enables the extension of the life of a sealed lead-acid secondary cell and ensures safety in the charging cycle. An industrial advantage of the invention is that it permits the use of sealed lead-acid secondary cells in application where high product reliability is required.

I claim:

1. A sealed lead-acid secondary cell of the type that absorbs oxygen by the negative electrode, characterized in that a cylindrical safety valve having side walls and a closed end is provided to cover a cylindrical valve seat such that said side wall surrounds said valve seat and a tubular porous member impregnated with an oxidation retardant liquid substance is in contact with said safety valve.

2. A sealed lead-acid secondary cell of the type that absorbs oxygen by the negative electrode, characterized in that a cylindrical safety valve having side-walls and a closed end is provided to cover a cylindrical valve seat wherein said side walls have an annular indentation on an interior surface thereof and a porous material impregnated with an oxidation retardant liquid substance is inserted in said annular indentation.

3. A cell as calimed in claim 1, wherein said tubular porpous member is positioned below said safety valve and is further surrounded by a barrier member so as to prevent a leakage of said liquid substance.

4. A cell as claimed in claim 1 or 2, wherein said cell has a detachably mounted explosion-preventing filter which has said safety valve disposed in the interior thereof.

5. A cell as claimed in claim 1 or 2, wherein two or more safety valves are arranged in series connection.

* * * * *